(12) United States Patent
Hirvonen

(10) Patent No.: US 7,225,644 B2
(45) Date of Patent: Jun. 5, 2007

(54) BENDABLE SUPPORT STRUCTURE IN A BENDING SECTION

(75) Inventor: Erkki Hirvonen, Tampere (FI)

(73) Assignee: Tamglass Ltd. Oy, Tampere (FI)

( * ) Notice: Subject to any disclaimer, the term of this patent is extended or adjusted under 35 U.S.C. 154(b) by 610 days.

(21) Appl. No.: 10/469,743

(22) PCT Filed: Mar. 5, 2002

(86) PCT No.: PCT/FI02/00167

§ 371 (c)(1),
(2), (4) Date: Sep. 4, 2003

(87) PCT Pub. No.: WO02/074705

PCT Pub. Date: Sep. 26, 2002

(65) Prior Publication Data

US 2004/0093903 A1    May 20, 2004

(30) Foreign Application Priority Data

Mar. 7, 2001    (FI) ................................. 20010454

(51) Int. Cl.
C03B 23/023    (2006.01)
(52) U.S. Cl. .......................................... 65/289; 65/348
(58) Field of Classification Search ................. 65/289; 198/860.1; 193/35 R
See application file for complete search history.

(56) References Cited

U.S. PATENT DOCUMENTS 3,832,153 A    8/1974  Bezombes
4,821,866 A *  4/1989  Melgaard .................... 198/494
4,852,712 A *  8/1989  Best ....................... 193/35 TE
5,499,275 A    3/1996  Kishi
5,556,444 A *  9/1996  Reunamaki .................. 65/106

FOREIGN PATENT DOCUMENTS

EP    0 261 611 A1    3/1988
EP    0 976 688 A1    2/2000

OTHER PUBLICATIONS

Interantional Search Report dated May 28, 2002.

* cited by examiner

Primary Examiner—Steven P. Griffin
Assistant Examiner—Queenie Dehghan
(74) Attorney, Agent, or Firm—Buchanan, Ingersoll & Rooney PC

(57) ABSTRACT

The invention relates to a bendable or vaulting support structure in a bending section or bending and tempering section for glass sheets or panels. The support structure comprises a plurality of support arms (10), which are attached by pivotal joints (7) to each other for a vaulting bridge. Each support arm (10) includes a bracket member (6) protruding from between two pivotal joints (7). Between the bracket members (6) is provided a guide lever mechanism, which directs bending or vaulting of the support structure with a constant-radius curvature. The guide lever mechanism is established by levers (11, 12, 13) set in a Z-pattern and provided with five pivotal joints (1-5), three (1, 4, 5) of which engage with the bracket members (6), and two articulated axles (2, 3) present therebetween, which connect the lever arms (11, 12, 13) to each other, are capable of moving relative to the bracket members (6).

19 Claims, 1 Drawing Sheet

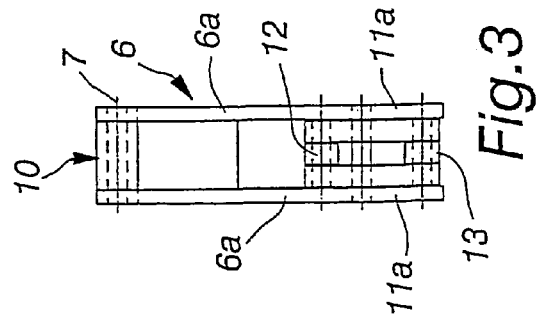
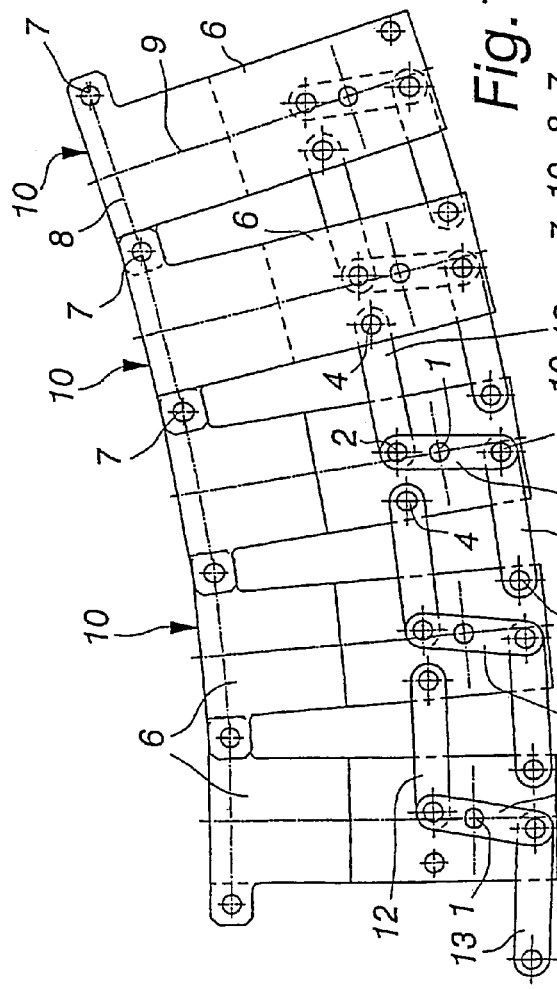
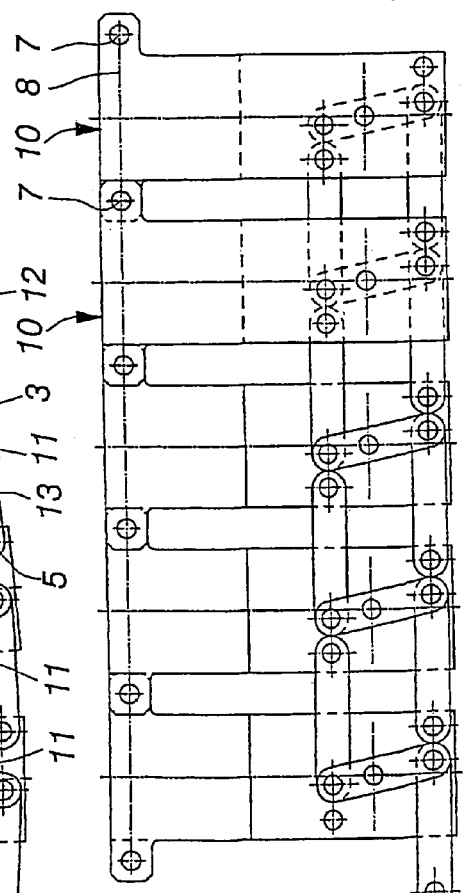

BENDABLE SUPPORT STRUCTURE IN A BENDING SECTION

The invention relates to a bendable support structure in a bending section or bending and tempering section of glass sheets or panels, said support structure comprising
1) a plurality of support arms, which are attached by pivotal joints to each other for a curving bridge, each support arm including a bracket member protruding from between two pivotal joints, and
2) a guide lever mechanism established by levers articulated between the bracket members of the support arms, which directs vaulting or bending of the support structure with a constant-radius curvature.

This type of support structure is known from the Applicant's patent publications U.S. Pat. No. 5,881,962 and U.S. Pat. No. 5,057,137. In this prior known solution, the equal-radius vaulting or curvature is established hydraulically by means of serial cylinders. Patent publication U.S. Pat. No. 5,498,275 discloses a support structure the uniform curvature or vaulting of which is established by means of control lever mechanism, having its articulated axles between the levers perpendicular to the glass to be bent.

It is an object of the invention to provide a bendable or vaulting support structure, wherein a constant radius of curvature can be ensured by a comparatively simple guide lever mechanism, with the directions of levers making it possible to have minor leverage forces and, thus, a light-weight support structure. Consequently, the inventive support structure can be applied in longer-than-before bridge structures without creating excessive weight-related stresses.

This object of the invention is achieved on the basis of the characterizing features set forth in the appended claim 1.

The non-independent claims disclose preferred embodiments of the invention.

One exemplary embodiment of the invention will now be described in more detail with reference to the accompanying drawing, in which FIG. 1 shows a support structure of the invention in a side view in a vaulted or bent condition, corresponding to a section of the entire length of a vaulting or arching bridge;

FIG. 2 shows the support structure of FIG. 1 in a rectified condition; and

FIG. 3 shows the support structure of FIG. 2 in an end view.

The vaulting bridge formed by the support structure can be trussed at its ends and supported at one or more points between its ends by a mechanical or hydraulic hoisting mechanism capable of lifting the bridge to a rectilinear condition or sagging to a curvature. Alternatively, the bridge may be fixed in vertical direction at its mid-point, in which case both of its ends are lifted and lowered. A third alternative is that one end of the bridge is vertically fixed and non-pivotable, whereby the other end of the bridge can be lifted and lowered for vaulting or rectifying the bridge. The support structure is used for bearing a roll conveyor and jet box beams present in a bending section or bending and tempering section, in such a way that the array of conveyor and box beams is caused to bend in a manner complementary to the support structure to a constant-radius curvature. Whenever the support structure is used in a simple bending section without tempering, the section is nevertheless provided with small jet boxes for heat strengthening the bent glass panels.

The support structure comprises a plurality of support arms 10, which are attached by pivotal joints 7 to each other for a vaulting bridge. Each support arm 10 includes a bracket member 6 protruding from between two pivotal joints 7 and having its center axis 9 perpendicular to a connecting line 8 between the pivotal joints 7 and crossing the connecting line 8 at an equal distance from the pivotal joints. The bracket member 6 comprises two spaced-apart plates 6a, between which is located a guide lever mechanism, comprising levers 12, 13 which connect adjacent bracket members 6 to each other. This guide lever mechanism, established by lever arms 11, 12, 13 articulated between the bracket members 6, directs the support structure to sag with a constant-radius curvature. In order to make this possible, the guide lever mechanism associated with each bracket member includes levers and joints as follows:

a) a first guide lever or wheel 11, which is pivotably bearing-mounted to the bracket member 6 by means of a first articulated axle 1 and which is provided with second and third articulated axles 2, 3 placed on the opposite sides of the first articulated axle 1;

b) a second guide lever 12, which extends between said second articulated axle 2 and a fourth articulated axle 4 attaching to the first adjacent support arm; and c) a third guide lever 13, which extends between said third articulated axle 3 and a fifth articulated axle 5 attaching to the second adjacent support arm 6.

All articulated axles 1-5 of the guide lever mechanism have an axial direction which is the same as that of joints 7 between the support arms 10. The second and third articulated axles 2, 3 are located at unequal distances from the first articulated axle 1, the greater distance being closer to the distal end of the bracket member 6. The difference in distances is roughly equal to the difference in motion ranges between the second and third articulated axles 2 and 3, which results from the fact that the guide levers 12 and 13 are located at unequal distances from the pivotal joints 7. In other words, the relationship between distances of the levers 12, 13 from the pivotal joint 7 is the same as the relationship between lever arms of the lever 11 on the opposite sides of the articulated axle 1.

The articulated axle 1 is located on a line 9 coincident with the bisector of a connecting line 8 between two pivotal joints 7 and perpendicular to this connecting line 8.

When the bridge is in its extended rectilinear condition, the articulated axles 2 and 3 are located on the opposite sides of the line 9, which extends through the articulated axle 1 and is perpendicular to the arch of the bridge. As the bridge is vaulted or bent, the articulated axles 2 and 3 move across the line 9.

The second and third guide levers 12, 13 of the guide lever mechanism are substantially parallel to each other and define an acute angle with the first guide lever 11 when the bridge is in its extended rectilinear condition. However, the acute angle between the levers progresses through a right angle to an obtuse angle as the bridge is in the process of vaulting or bending. In the present context, directions of the levers 11, 12, 13 are conceived as the directions of connecting lines between the articulated axles 2-5 present at the ends thereof.

As depicted in FIG. 3, the first guide lever 11 is constituted by two parallel levers 11a, between whose ends are located the ends of the second and third guide levers 12, 13. The levers 12, 13 are subjected mainly to a tensile stress. The levers 11 are subjected to an almost perpendicular bending stress over relatively short lever arms. The guide lever mechanism does not require any extra space in lateral direction unlike e.g. the solution disclosed in Patent publication U.S. Pat. No. 5,498,275.

The bridge constructed with a support structure of the invention may have a length of more than 4 m, and hence capable of bending very large glass sheets or panels.

The invention claimed is:

1. A bendable support structure in a bending section or bending and tempering section of glass sheets or panels, the support structure comprising
   1) a plurality of support arms, which are attached to each other by a plurality of pivotal joints to form a vaulting bridge, each support arm including a bracket member protruding from between two pivotal joints, and
   2) a guide lever mechanism established by lever arms articulated between the bracket members of the support arms, which directs vaulting or bending of the support arms about said pivotal joints to define a support structure with a constant-radius curvature,
   wherein the guide lever mechanism comprises
   a) a first guide lever or wheel, which is pivotably bearing-mounted to the bracket member by means of a first articulated axle and which is provided with second and third articulated axles placed on the opposite sides of the first articulated axle;
   b) a second guide lever, which extends between the second articulated axle and a fourth articulated axle attaching to a first adjacent support arm; and
   c) a third guide lever, which extends between the third articulated axle and a fifth articulated axle attaching to a second adjacent support arm; and all articulated axles of the guide lever mechanism have an axial direction which is the same as that of the joints between the support arms.

2. A support structure as set forth in claim 1, wherein the guide lever mechanism has its first articulated axle located on a line coincident with the bisector of a connecting line for two pivotal joints between the support arms and perpendicular to this connecting line.

3. A support structure as set forth in claim 2, wherein the guide lever mechanism has its second and third guide levers substantially parallel to each other and defining an acute angle with the first guide lever when the bridge is in its extended rectilinear condition, the acute angle progressing through a right angle to an obtuse angle as the bridge is vaulted, the levers' directions representing the directions of connecting lines between the articulated axles thereof.

4. A support structure as set forth in claim 2, wherein the bracket member of the support arms comprises two spaced-apart plates, the guide lever mechanism being located therebetween.

5. A support structure as set forth in claim 2, wherein the first guide lever is constituted by two parallel levers, the ends of the second and third guide levers being located between the ends thereof.

6. A support structure as set forth in claim 1, wherein the guide lever mechanism has its second and third guide levers substantially parallel to each other and defining an acute angle with the first guide lever when the bridge is in its extended rectilinear condition, the acute angle progressing through a right angle to an obtuse angle as the bridge is vaulted, the levers' directions representing the directions of connecting lines between the articulated axles thereof.

7. A support structure as set forth in claim 6, wherein the bracket member of the support arms comprises two spaced-apart plates, the guide lever mechanism being located therebetween.

8. A support structure as set forth in claim 1, wherein the bracket member of the support arms comprises two spaced-apart plates, the guide lever mechanism being located therebetween.

9. A support structure as set forth in claim 1, wherein the first guide lever is constituted by two parallel levers, the ends of the second and third guide levers being located between the ends thereof.

10. A bendable support structure in a bending section or bending and tempering section of glass sheets or panels, the support structure comprising:
    1) a plurality of support arms, which are attached by pivotal joints to each other for a vaulting bridge, each support arm including a bracket member protruding from between two pivotal joints, and
    2) a guide lever mechanism established by lever arms articulated between the bracket members of the support arms, which directs vaulting or bending of the support structure with a constant-radius curvature
    wherein the guide lever mechanism comprises;
    a) a first guide lever or wheel, which is pivotably bearing-mounted to the bracket member by means of a first articulated axle and which is provided with second and third articulated axles placed on the opposite sides of the first articulated axle;
    b) a second guide lever, which extends between the second articulated axle and a fourth articulated axle attaching to a first adjacent support arm; and
    c) a third guide lever, which extends between the third articulated axle and a fifth articulated axle attaching to a second adjacent support arm;
    wherein all articulated axles of the guide lever mechanism have an axial direction which is the same as that of the joints between the support arms; and
    wherein the second and third articulated axles are located at unequal distances from the first articulated axle, the greater distance being closer to the distal end of the bracket member.

11. A support structure as set forth in claim 10, wherein the guide lever mechanism has its first articulated axle located on a line coincident with the bisector of a connecting line for two pivotal joints between the support arms and perpendicular to this connecting line.

12. A support structure as set forth in claim 10, wherein the second and third articulated axles are located on the opposite sides of the line, which extends through the first articulated axle and is perpendicular to the arch of the bridge with the bridge in its extended rectilinear condition, and that the second and third articulated axles move across the line as the bridge is vaulted.

13. A support structure as set forth in claim 10, wherein the guide lever mechanism has its second and third guide levers substantially parallel to each other and defining an acute angle with the first guide lever when the bridge is in its extended rectilinear condition, the acute angle progressing through a right angle to an obtuse angle as the bridge is vaulted, the levers' directions representing the directions of connecting lines between the articulated axles thereof.

14. A support structure as set forth in claim 10, wherein the bracket member of the support arms comprises two spaced-apart plates, the guide lever mechanism being located therebetween.

15. A support structure as set forth claim 10, wherein the first guide lever is constituted by two parallel levers, the ends of the second and third guide levers being located between the ends thereof.

16. A bendable support structure in a bending section or bending and tempering section of glass sheets or panels, the support structure comprising:
1) a plurality of support arms, which are attached by pivotal joints to each other for a vaulting bridge, each support arm including a bracket member protruding from between two pivotal joints, and
2) a guide lever mechanism established by lever arms articulated between the bracket members of the support arms, which directs vaulting or bending of the support structure with a constant-radius curvature, wherein the guide lever mechanism comprises:
a) a first guide lever or wheel, is pivotably bearing-mounted to the bracket member by means of a first articulated axle and which is provided with second and third articulated axles placed on the opposite sides of the first articulated axle;
b) a second guide lever, which extends between the second articulated axle and a fourth articulated axle attaching to a first adjacent support arm; and
c) a third guide lever, which extends between the third articulated axle and a fifth articulated axle attaching to a second adjacent support arm;

wherein all articulated axles of the guide lever mechanism have an axial direction which is the same as that of the joints between the support arms; and wherein the second and third articulated axles are located on the opposite sides of a line which extends through the first articulated axle and is perpendicular to the arch of the bridge with the bridge in its extended rectilinear condition, and the second and third articulated axles move across the line as the bridge is vaulted.

17. A support structure as set forth in claim 16, wherein the guide lever mechanism has its second and third guide levers substantially parallel to each other and defining an acute angle with the first guide lever when the bridge is in its extended rectilinear condition, the acute angle progressing through a right angle to an obtuse angle as the bridge is vaulted, the levers' directions representing the directions of connecting lines between the articulated axles thereof.

18. A support structure as set forth in claim 16, wherein the bracket member of the support arms comprises two spaced-apart plates, the guide lever mechanism being located therebetween.

19. A support structure as set forth in claim 16, wherein the first guide lever is constituted by two parallel levers, the ends of the second and third guide levers being located between the ends thereof.

* * * * *